United States Patent [19]
Tanaka et al.

[11] 3,717,763
[45] Feb. 20, 1973

[54] SCINTILLATION CAMERA DEVICE

[75] Inventors: Eiichi Tanaka, Tokyo; Toshiyuki Hiramoto; Norimasa Nohara, both of Chiba; Shigeyasu Kurihara, Yokohama, all of Japan

[73] Assignees: Director of the National Institute of Radiological Sciences, Science and Technology Agency, Anagawa, Chiba-shi; Tokyo Shibaura Electric Co., Ltd., Kawasaki-shi, both of Japan

[22] Filed: Oct. 1, 1970

[21] Appl. No.: 77,188

[30] Foreign Application Priority Data

Oct. 1, 1969 Japan..............................44/77804

[52] U.S. Cl..........................250/71.5 S, 250/83.3 R
[51] Int. Cl...............................................G01t 1/20
[58] Field of Search.........250/71.5 R, 71.5 S, 83.3 R

[56] References Cited

UNITED STATES PATENTS

| | | |
|---|---|---|
| 3,509,341 | 4/1970 | Hindel et al.....................250/71.5 S |
| 3,573,458 | 4/1971 | Anger...............................250/71.5 S |
| 3,011,057 | 11/1961 | Anger...............................250/71.5 S |

*Primary Examiner*—Archie R. Borchelt
*Attorney*—Flynn & Frishauf

[57] ABSTRACT

A scintillation camera device wherein output pulse signals from photomultipliers optically coupled with a scintillator giving forth light upon absorption of radiation emitted from a radioactive isotope taken into a foreground subject are used as an input to a delay element such as a delay line for separating said signals in time sequence in proportion to the position of each of said photomultipliers; output signals from said delay element are shaped into single polar symmetrical wave forms in a wave forming circuit comprises of a single delay line in such a manner that the peak amplitude of the mixed wave form obtained in accordance with the position of each photomultiplier becomes proportionate to the position of a scintillation point; and the peak amplitude of said mixed wave forms is indicated on a cathode ray tube as a signal representing the position of the scintillation point.

8 Claims, 9 Drawing Figures

SCINTILLATION CAMERA DEVICE

The present invention relates to improvements in a scintillation camera device used in nuclear medicine to determine the distribution of a radioactive isotope taken into a human body or other objects.

When radiations emitted from a radioactive isotope taken into a foreground subject pass through a collimator into a scintillator, it gives off fluorescent rays. The point of said illumination corresponds to the position of a radioactive isotope in a foreground subject, so that the plane distribution of said radioactive isotope is observed in the form of an image of fluorescent rays appearing in the scintillator. Since, however, these rays are extremely faint, there are additionally used in practice a plurality of photomultipliers optically coupled with a scintillator which are arranged, for example, in the form of a regular hexagon. Outputs from the photomultipliers are proportionate to the intensity of light brought thereinto, so that if those of said outputs which are given off from a photomultiplier adjacent to a given scintillation point in the scintillator are indicated on a cathode ray tube, then the position of the scintillation point will be distinctly defined. However, with a conventional scintillation camera device provided with a limited number of photomultipliers, outputs from the photomultipliers are multiplied by weighting factors using a resistance matrix thereby to detect an exact scintillation point.

Now considering only one dimension, let it be assumed that a given longest diagonal line of a regular hexagon in which the photomultipliers are arranged is represented by an axis X, those of the photomultipliers which are positioned in said axis $X$ are denoted as $a$, $b$, $c$, $d$ and $e$ and outputs therefrom as $a_1$, $b_1$, $c_1$, $d_1$ and $e_1$. Generally, said outputs are multiplied by two groups of weighting factors. The weighting factors of one group designated as, for example, $K_1$, $K_2$, $K_3$, $K_4$ and $K_5$ linearly increase in the order mentioned. The weighting factors of the other group indicated as, for example, $H_1$, $H_2$, $H_3$, $H_4$ and $H_5$ linearly decrease in the order mentioned. If a product arrived at by multiplying the outputs $a_1$, $b_1$, $c_1$, $d_1$ and $e_1$ from the photomultipliers $a$, $b$, $c$, $d$ and $e$ by $K_1$, $K_2$, $K_3$, $K_4$ and $K_5$ respectively is denoted as $X^+$, *which represents the position of the scintillation point measured in the positive direction of the X co-ordinate* then there will result the following equation:

$$X^+ = K_1 a_1 + K_2 b_1 + K_3 c_1 + K_4 d_1 + K_5 e_1$$

If a product arrived at by multiplying the outputs $a_1$, $b_1$, $c_1$, $d_1$ and $e_1$ from the photomultipliers $a$, $b$, $c$, $d$ and $e$ by $H_1$, $H_2$, $H_3$, $H_4$ and $H_5$ respectively is indicated as $X^-$, which represents the position of the scintillation point measured in the megative direction of the $X$ co-ordinate then there will result the following equation:

$$X^- = H_1 a_1 + H_2 b_1 + H_3 c_1 + H_4 d_1 + H_5 e_1$$

$X^+ - X^- = X_0$ is determined from the above two equations to define the position of a scintillation point on the axis $X$.

As apparent from the foregoing description, outputs from the photomultipliers are multiplied by the aforementioned weighting factors using the resistance matrix, so that outputs from photomultipliers remote from the scintillation point are always multiplied by a fixed weighting factor, even when there are introduced only small amounts of light into a scintillator coupled with said photomultipliers. Accordingly, the prior art scintillation camera device has the drawbacks that there are unduly emphasized statistical fluctuations in the number of photoelectrons brought to the first dynode of the photomultiplier and noises caused by the scattering of light, resulting in the failure to locate an exact scintillation point and in consequence a reduced image resolving power. Further, the limited number of photomultipliers leads to the edge distortion of an image obtained. To date, there has not been developed any suitable means for eliminating such shortcomings.

SUMMARY OF THE INVENTION

The object of the present invention is to provide a novel scintillation camera device wherein output signals from the photomultipliers used are separated by a delay element such as a delay line in time sequence according to the position of said photomultipliers; outputs from said delay element such as a delay line are shaped into single polar symmetrical wave forms in a wave forming circuit comprises of a single delay line, thereby to detect an exact scintillation point utilizing the fact that the peak amplitude of a composite of said symmetrical wave forms corresponds to the position of a scintillation point. According to the present invention, outputs from photomultipliers distant from a scintillation point are excluded from the determination of the position of the scintillation point, thereby obtaining signals representing an exact scintillation point and in consequence increasing an image resolving power.

The present invention can be more fully understood from the following detailed description when taken in connection with the accompanying drawings, in which.

Figure 5:
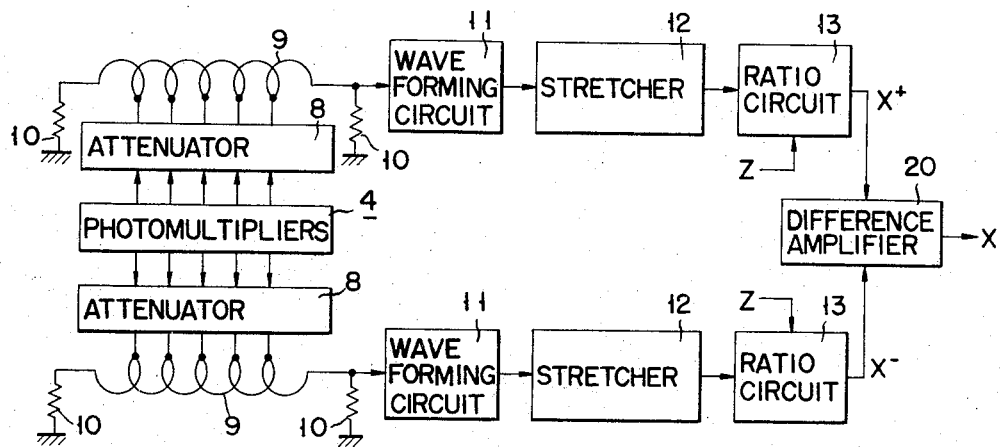
Figure 4A:
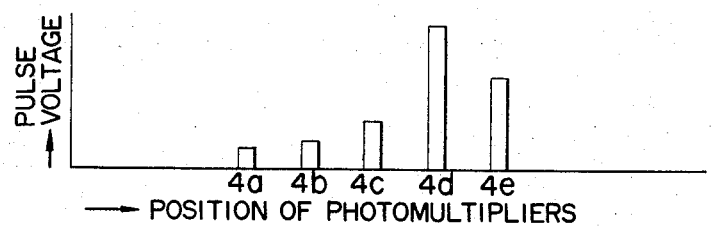
FIG. 4A illustrates output pulses from the respective photomultipliers with respect to the scintillation point of FIG. 1.
Figure 4B:
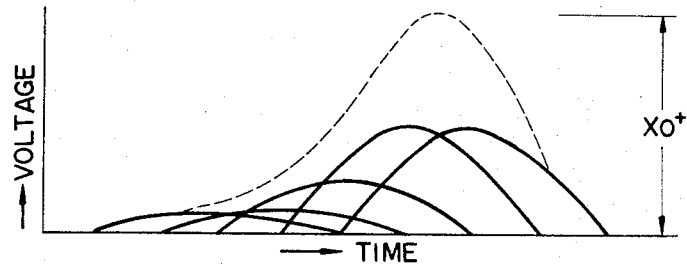
FIG. 4B shows wave forms in a positive direction obtained by shaping the waves of FIG. 4A.
Figure 4C:
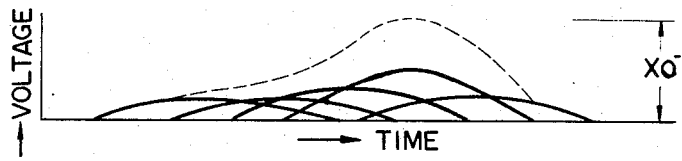
Figure 6:
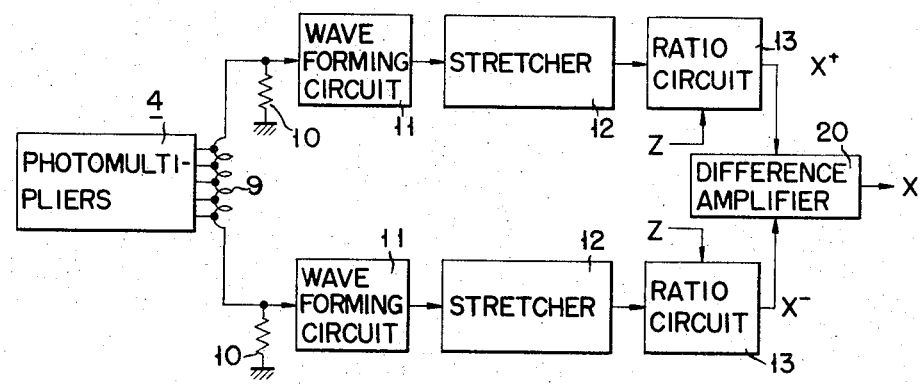

FIG. 4C indicates wave forms in a negative direction obtained by shaping the waves of FIG. 4A;

FIG. 5 is a block diagram regarding a given co-ordinate axis, showing a first embodiment of the invention;

FIG. 6 is a block diagram showing another embodiment of the invention; and

Figure 7:
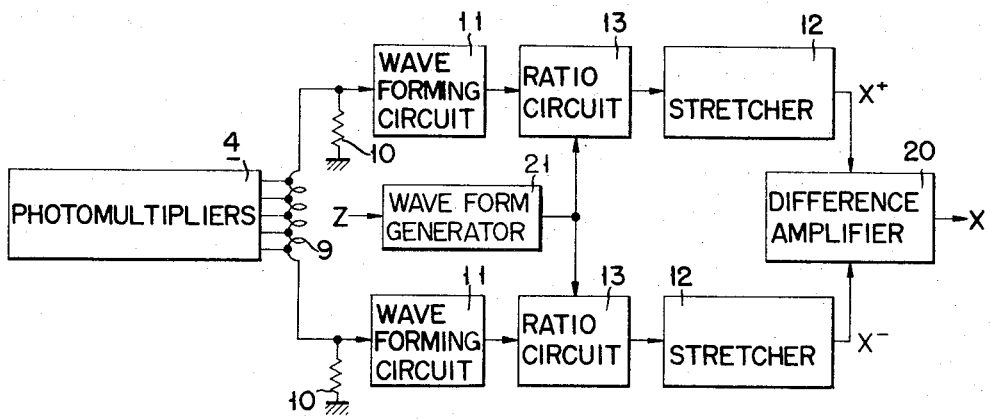

FIG. 7 is a block diagram indicating still another embodiment of the invention.

Figure 2:
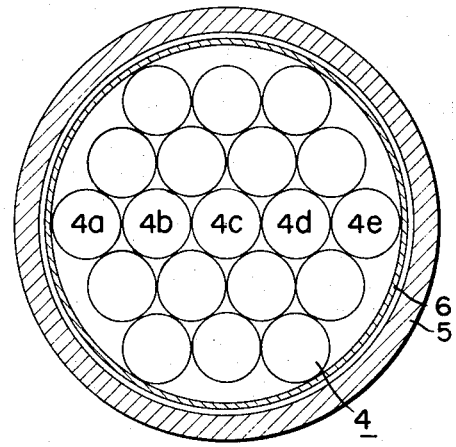
FIG. 2 is a sectional view on line II—II of FIG. 1.
Figure 3:
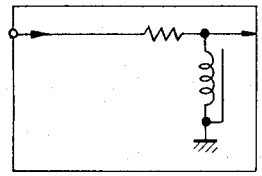
FIG. 3 is a concrete diagram of a wave forming circuit used in FIG. 1.

There will now be described an embodiment of the present invention by reference to FIG. 1. Reference numeral 1 denotes a foreground subject. Above the foreground subject 1 are positioned a scintillator 2 for giving forth fluorescent rays upon absorption of radiation emitted from the foreground subject 1, and a plurality of photomultipliers 4 for detecting fluorescent rays from the scintillator 2 through a light guide 3, said photomultipliers 4 (for example, 19 units as shown in FIG. 2) being arranged in the form of a substantially regular hexagon, and some of said photomultipliers 4 being linearly disposed on the central line of said hexagon as indicated in FIG. 2. These scintillator 2, light guide 3 and plural photomultipliers 4 are enveloped in a photomagazine 5 and received in a box member 6. The lower opening of the box member 6 which faces the foreground subject 1 is fitted with a collimator 7 for collimating radiation from the foreground subject 1. Output signals from the plural photomultipliers are conducted to the terminals of a delay line 9 through attenuator 8. The delay line 9 may be replaced by a delay element. Both ends of the delay line 9 are grounded through the resistors 10. One of said terminals is connected to the input terminal of a wave forming circuit 11, the output terminal of which is connected to the input terminal of a cathode ray tube 14 through a stretcher 12 and ratio circuit 13 in turn. The wave forming circuit 11 consists of a single delay line connected as shown in FIG. 3.

A circuit 15 extending from the attenuators 8 for receiving output from the photomultipliers 4 to the terminal X of the cathode ray tube 14 is intended to defined the position of the co-ordinate axis X included in the co-ordinate axes indicating a scintillation point. With respect to the coordinate axis Y, there is connected exactly the same circuit 16 as the aforesaid circuit 15 to the terminal Y of said cathode ray tube 14. The output terminals of the plural photomultipliers 4 are connected to a mixer 17, outputs from said photomultipliers 4 being supplied to the ratio circuit 13 after being added up. The output side of the mixer 17 is connected to the terminal Z of the cathode ray tube 14 through a pulse height analyzer (not shown) for unblanking.

There will now be described the operation of a scintillation camera device of the present invention arranged as described above with particular reference for briefness to only one dimension (there is taken, for example, the co-ordinate axis X).

Figure 1:
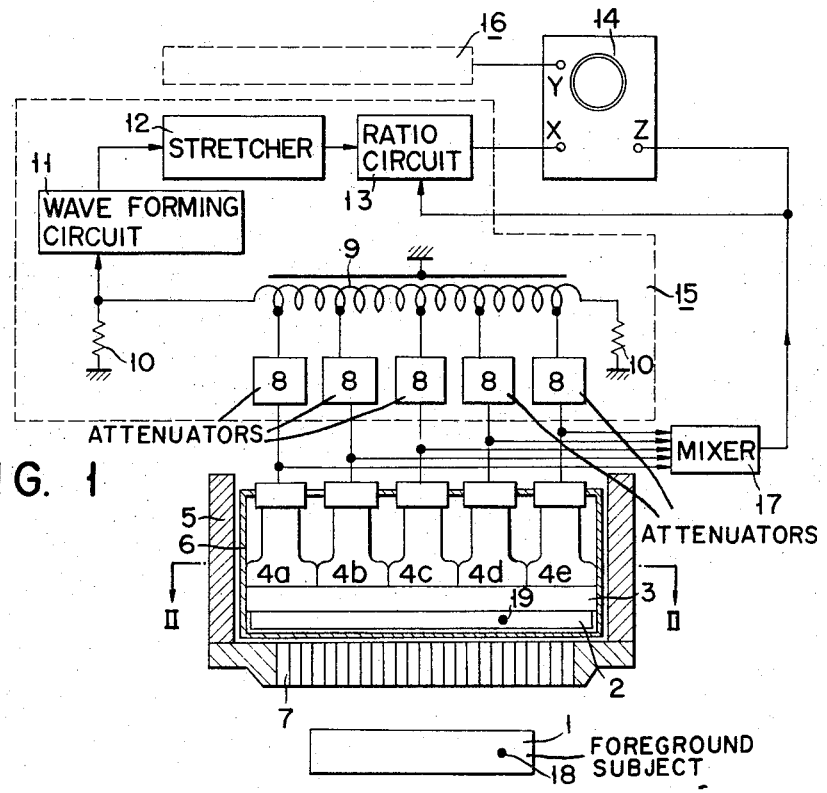
FIG. 1 shows a schematic arrangement of the scintillation camera device of the present invention.

When radiations emitted at point 18 of the foreground subject 1 of FIG. 1 are absorbed into the scintillator 2 through the collimator 7, then the scintillator gives forth light at point 19. Said light enters the photomultipliers 4 through the light guide 3 to be converted to electrical current. Outputs from the photomultipliers 4 assume, as shown in FIG. 4A, such wave forms as are proportionate to the quantity of light introduced. Said outputs are weighted in the attenuators 8, supplied to the delay line 9, separated in time sequence according to the position of the photomultipliers, and thereafter shaped in the wave forming circuit 11 into single polar symmetrical wave forms shown in solid lines in FIG. 4B. A composite of these single polar symmetrical wave forms presents such a pattern as indicated in a dotted line in FIG. 4B. The peak amplitude $X_0^+$ of said composite wave is proportionate to the co-ordinate axis representing the position of the scintillation point 19, showing that said amplitude is not affected by the output of a photomultiplier, for example 4a, remote from the scintillation point 19. The peak amplitude $X_0^+$ is stretched in the stretcher 12 and a signal bearing such amplitude is conducted to the ratio circuit 13. On the other hand, signals proportionate to the energies of radiations emitted are added up in the mixer 17 to normalize outputs from the stretcher 12. Signals thus normalized are indicated on the cathode ray tube 14 as signals showing the position of the scintillation point 19 on the co-ordinate axis X.

After being summed up in the mixer 17, said signals proportionate to radiation energy are also conducted to the terminal Z of the cathode ray tube 14 through the pulse height analyzer (not shown) for unblanking.

FIG. 5 is a block diagram regarding a given co-ordinate axis, for example, axis X, showing a first embodiment of the present invention. In this embodiment there are used two delay lines 9, to each of which there are connected in series the wave forming circuit 11, stretcher 12 and ratio circuit 13 in turn. Outputs from the photomultipliers 4 representing the positive direction of the co-ordinate axis X pass through the attenuators 8 and are separated in time sequence in one of said delay lines 9 and shaped into single polar symmetrical wave forms illustrated in solid lines in FIG. 4B in the wave forming circuit 11. A composite of these wave forms assumes a pattern indicated in a dotted line in FIG. 4B. As mentioned above, the peak amplitude $X_0^+$ of said composite wave is proportionate to the position of the scintillation point in the positive direction of the co-ordinate axis X. Said composite wave is stretched in the stretcher 12 and normalized in the ratio circuit 13 by signals (Z signals) proportionate to radiation energy to form signals $X^+$ representing the position of the scintillation point measured in the positive direction of the X co-ordinate, hereinafter simply referred to as positive position signals.

There will now be described signals $X^-$ representing the position of the scintillation point measured in the negative direction of the X co-ordinate, hereinafter referred to as negative position signals. Outputs from the photomultipliers 4 are supplied through the attenuators 8 to the other delay line 9 to be separated in time sequence and shaped into single polar symmetrical waves shown in solid lines in FIG. 4C in the wave forming circuit. A composite of these single polar symmetrical waves assumes a wave form indicated in a dotted line in FIG. 4C. The peak amplitude $X_0^-$ of said composite wave is proportionate to the position of the scintillation point 19 in the negative direction of the co-ordinate axis X. The composite wave passes through the stretcher 12 and is normalized in the ratio circuit 13 by signals (Z signals) proportionate to radiation energy to form signals $X^-$ representing the negative position signals of the axis X.

A differential amplifier 20 determines a balance between the values of the positive position signals and negative position signals $X^-$, thereby forming a signal X denoting the position of the scintillation point in the axis X.

In another embodiment of FIG. 6, to both ends of the delay line 9 are connected a first and a second series circuitry each of which consists of the wave forming circuit 11, stretcher 12 and ratio circuit 13, the attenuators are eliminated and outputs from the photomultipliers 4 are weighted by attenuation of the signal in the single delay line 9.

In still another embodiment of FIG. 7, outputs from the photomultipliers 4 are supplied to a single delay line 9. To both ends of the delay line 9 are connected a first and a second series circuitry for obtaining signals $X^+$ representing the positive position signals, each of which consists of the wave forming circuit 11, ratio circuit 13 and stretcher 12 arranged in this order. In the embodiment of FIG. 7, the ratio circuit 13 and stretcher 12 are reversed in the sequence of connection from the preceding embodiments. Further, outputs from the photomultipliers are weighted by signals (Z signals) proportionate to radiation energy. When supplied to the delay line 9, said outputs are separated in time sequence as in the foregoing embodiments. The positive position signals $X^+$ are formed into single polar symmetrical waves in the wave forming circuit 11 involved in the first series circuitry. The peak amplitude of the composite wave is proportionate to the position of the scintillation point 19 shown in FIG. 1 in the positive direction of the co-ordinate axis X. Z signals are shaped by the wave form generator 21 into such a wave form which presents a monotonous increase or decrease for a required length of time. The output from wave forming circuit is weighted by the output from the wave forming generator 21. Accordingly, when conducted to the ratio circuit 13, said Z signals weight the composite wave form. Outputs from the ratio circuit 13 are stretched in the stretcher 12 to obtain signals $X^+$ representing the positive position signals. From the second series circuitry connected to the other end of the delay line 9 are obtained signals $X^-$ representing the negative position signals through similar operations as those mentioned above. The differential amplifier 20 determines a balance between the values of signals $X^+$ and signals $X^-$ indicating the negative position signals indicating the positive position signals to obtain signals X representing the position of the scintillation point 19 on the co-ordinate axis X.

AS mentioned above, the present invention involves a delay line for the axis X, a delay line for the axis Y and a wave forming circuit comprised of a single delay element, so as to exclude the output of photomultipliers remote from the scintillation point in determining the position of the scintillation point, and control the linearity of signals representing the position of said scintillation point, thereby providing a scintillation camera device having a good resolving power.

What we claim is:

1. A scintillation camera device comprising: a scintillator for giving forth light upon absorption of radiation emitted from a radioactive isotope taken into a foreground subject; a plurality of photomultipliers for receiving light from the scintillator; first and second groups of serially connected delay devices, each group associated with the co-ordinate axes X and Y respectively, for separating outputs from the photomultipliers in time sequence in accordance with the co-ordinate position of said photomultipliers; wave forming circuits for shaping outputs from the respective groups of delay elements into single polar symmetrical wave forms thereby to produce a composite output for each co-ordinate axis, the peak amplitude of which corresponds to the respective position co-ordinate of the scintillation point; ratio circuits for normalizing outputs from the wave forming circuits by signal proportionate to radiation energy; and a cathode ray tube for indicating outputs from the ratio circuits as signals representing the position of the scintillation point on the co-ordinate axes X and Y.

2. A device according to claim 1 comprising attenuators coupled between the respective delay devices and photomultipliers so as to multiply outputs from said photomultipliers by a weighting factor.

3. A device according to claim 1 wherein said wave forming circuits each comprise a single delay line.

4. A scintillation camera device comprising: a scintillator for giving forth light upon absorption of radiation emitted from a radioactive isotope taken into a foreground subject; a plurality of photomultipliers for receiving light from the scintillator; a first delay element for obtaining a positive position signal associated with the co-ordinate axis X and Y respectively for separating in time sequence those signals of outputs from the photomultipliers, in accordance with the position of said photomultipliers; a second delay element for obtaining a negative position signal associated with the co-ordinate axes X and Y respectively for separating in time sequence those signals of outputs from the photomultipliers, in accordance with the position of said photomultipliers; attenuators connected between the photomultipliers and the first and second delay elements of each axis so as to multiply the output from each of said photomultipliers by a weighting factor; first and second series circuits, each of which comprises a wave forming circuit connected to the output terminals of the first and second delay elements respectively so as to shape the outputs from each photomultiplier after leaving the delay elements into single polar symmetrical wave forms, a stretcher for stretching the peak amplitude of a composite of said symmetrical wave forms, and a ratio circuit for normalizing the output from the stretcher by a signal proportionate to the radiation energy; differential amplifiers for comparing the values of outputs from the first and second series circuits to obtain a balance therebetween; and a cathode ray tube for indicating signals representing said balance as the position of a scintillation point.

5. A scintillation camera device comprising: a scintillator for giving forth light upon absorption of radiation emitted from a radioactive isotope taken into a foreground subject; a plurality of photomultipliers for receiving light from the scintillator; delay elements associated with the co-ordinate axes X and Y for separating outputs from the photomultipliers in the time sequence in accordance with the position of said photomultipliers; first series circuits for generating positive position signals associated with the co-ordinate axes X and Y and second series circuits for generating negative position signals associated with the co-ordinate axes X and Y, each series circuit comprising a wave forming circuit connected to an end of the delay element for shaping the output from each photomultiplier after leaving said delay element into a single polar symmetrical wave form and then producing a composite of said symmetrical wave forms, a stretcher for normalizing outputs from the wave forming circuit by a time-varying signal with an initial amplitude proportionate to the radiation energy and a stretcher for stretching the peak amplitude of the output wave from the ratio circuit; a differential amplifier for comparing the values of outputs from the first and second series circuits to obtain a balance therebetween; a cathode ray tube for indicating signals representing said balance as the position of a scintillation point; and a wave form generator for shaping Z signals into said time-varying signal.

6. A scintillation camera device comprising: a scintillator for giving forth light upon absorption of radiation emitted from a radioactive isotope taken into a foreground subject; a plurality of photomultipliers for receiving light from the scintillator; delay elements associated with the co-ordinate axes X and Y for separating outputs from the photomultipliers in time sequence in accordance with the co-ordinate position of said photomultipliers; first series circuits for generating positive position signals associated with the co-ordinate axes X and Y and second series circuits for generating negative position signals associated with the co-ordinate axes X and Y, each series circuit comprising a wave forming circuit connected to an end of the delay element for shaping the output from each photomultiplier after leaving the delay element into a single polar symmetrical wave form, and then producing a composite of said symmetrical wave forms, a stretcher for stretching the peak amplitude of the output from the wave forming circuit and a ratio circuit for normalizing the output from the stretcher by a signal proportionate to the radiation energy; a differential amplifier for comparing the values of outputs from the first and second series circuits to obtain a balance therebetween; and a cathode ray tube for indicating signals obtained from the differential amplifier which represent the position of the scintillation point.

7. A device according to claim 1 wherein said groups of delay devices each comprise a tapped delay element, each tap being coupled to a photomultiplier, the output of said delay element being coupled to said wave forming circuit.

8. A device according to claim 1 wherein the output of each delay device in each of said groups of delay devices constitutes an input to the next serially connected delay device, along with an output from a photomultiplier.

* * * * *

PO-1050
(5/69)

UNITED STATES PATENT OFFICE
CERTIFICATE OF CORRECTION

Patent No. 3,717,763            Dated February 20, 1973

Inventor(s) Eiichi TANAKA, et al

It is certified that error appears in the above-identified patent and that said Letters Patent are hereby corrected as shown below:

IN THE CLAIMS:

Column 5, claim 1, line 53, before "for shaping"
                 insert --connected to the respective delay devices--;

line 54, delete "elements" insert --devices--;

line 55, delete "thereby to produce" insert --and then producing--;

line 56, delete "which corresponds" insert --a composite output corresponding--;

Column 6, claim 4, lines 22 and 23, change "comprises" to --includes--;

line 24, delete "first and second" insert --respective--;

lines 24 and 25, delete "respectively so as"

line 27, after "forms," insert --and to then produce a composite output for each coordinate axis--;

line 28, before "composite" delete "a" and insert --the--.

Signed and sealed this 3rd day of July 1973.

(SEAL)
Attest:

EDWARD M. FLETCHER, JR.          Rene Tegtmeyer
Attesting Officer                 Acting Commissioner of Patents